(12) United States Patent
Shuai et al.

(10) Patent No.: US 10,879,785 B2
(45) Date of Patent: Dec. 29, 2020

(54) VIRTUAL SYNCHRONOUS INVERTER WITH FAST TRANSIENT INRUSH FAULT CURRENTS RESTRAINING METHOD THEREOF

(71) Applicant: Hunan University, Hunan (CN)

(72) Inventors: Zhikang Shuai, Hunan (CN); Wen Huang, Hunan (CN); Zheng Shen, Hunan (CN); Jun Wang, Hunan (CN); Junbin Fang, Hunan (CN); Chao Shen, Hunan (CN); Yang Li, Hunan (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 15/863,955

(22) Filed: Jan. 7, 2018

(65) Prior Publication Data

US 2018/0145582 A1    May 24, 2018

(30) Foreign Application Priority Data

Jan. 16, 2017 (CN) .......................... 2017 1 0029129

(51) Int. Cl.
*H02M 1/32* (2007.01)
*H02M 7/5387* (2007.01)

(52) U.S. Cl.
CPC .......... *H02M 1/32* (2013.01); *H02M 7/5387* (2013.01); *H02M 7/53873* (2013.01); *H02M 2001/325* (2013.01)

(58) Field of Classification Search
CPC ............ H02M 1/32; H02M 2001/325; H02M 7/5387; H02M 7/53873
See application file for complete search history.

(56) References Cited

U.S. PATENT DOCUMENTS

| | | | |
|---|---|---|---|
| 2015/0115902 A1* | 4/2015 | Panosyan | H02H 7/067 322/21 |
| 2017/0155247 A1* | 6/2017 | Liu | H02J 3/18 |
| 2017/0271867 A1* | 9/2017 | Hamada | H02M 1/32 |

* cited by examiner

*Primary Examiner* — Fred E Finch, III
*Assistant Examiner* — Rafael O De Leon Domenech
(74) *Attorney, Agent, or Firm* — Bayramoglu Law Offices LLC (57) ABSTRACT

A fault inrush transient current restraining type virtual synchronous inverter and thereof is disclosed. The invention solves the problem that a virtual synchronous inverter will be burned due to inrush transient current in an extreme situation of a symmetrical fault occurring on the grid side by setting an information collection module for inverter output voltages and currents, a virtual synchronous inverting control module, a fault detection and synthesize module, a hysteresis comparison control module and a post fault clearing switch back grid-tie control module.

6 Claims, 4 Drawing Sheets

VIRTUAL SYNCHRONOUS INVERTER WITH FAST TRANSIENT INRUSH FAULT CURRENTS RESTRAINING METHOD THEREOF

CROSS REFERENCE OF RELATED APPLICATION

This invention claims priority under 35 U.S.C. 119(a-d) to CN 2017100291299, filed Jan. 16, 2017.

BACKGROUND OF THE PRESENT INVENTION

Field of Invention

The present invention relates to the inverter control technical field, and more particularly to a short circuit fault inrush transient current restraining type virtual synchronous inverter and a control method thereof.

Description of Related Arts

With a rapid development of the society, the conflict between an explosive increase in energy demands and a rapid deterioration of the environment arises, which brings more and more attention to the renewable energy such as wind and solar energy. Most of the renewable energy output the electricity in forms of alternative current of varied frequencies or direct current, wherein a DC-AC inverter is necessary for accessing the grid. With a sustaining development of the micro-grid, the need for researches on the safety and reliability of the inverter are more and more pressing.

In order for a better performance of the inverter, researches on various inverter control methods are carried out, such as the droop control, the PQ control, the VF control the virtual synchronous control and etc. The virtual synchronous control strategy also called synchronverter is an inverter control strategy which mimics the characteristics of the synchronous generator and was firstly proposed by professor Zhong Qingchang in 2011. The virtual synchronous control strategy gives the electronic inverter virtual inertia similar to that in a synchronous generator, which improves the dynamic performance of the inverter significantly and enables the inverter to restrain the high-frequency ripple in the grid while generates electricity. The virtual synchronous inverter is superior to other control strategies and is gaining more and more attentions. In order to mimic dynamic performance better, an inner current loop is not added in the virtual synchronous control strategy, which will cause high inrush transient current while a short circuit fault occurs in the grid. In order to protect the inverter, capacity of the inverter needs to be enlarged. Thus, cost of the virtual synchronous inverter is increased, which will limit the further popularization of the virtual synchronous inverter.

When a short circuit fault occurs in the grid, the conventional method is to disconnect the inverter from the grid directly to ensure the safety of the inverter, which endangers a safe and reliable power supply of the grid. Most countries have established their own grid connection rules to regulate the use of inverter, in which the inverter is required to keep maintaining grid-tie for a while when a short circuit fault occurs to improve the safety and reliability of the grid power supply. The safe of the inverter is thus endangered, which demands an inrush transient current restraining method for the virtual synchronous inverter in urgent.

Conventionally, the research on the virtual synchronous inverter is focused on a steady-state control and parameters optimization. There are lots of studies on how to apply the virtual synchronous control on renewable energies such as the solar cell, the wind turbine, the fuel cell and the gas turbine. Many scholars also use small signal analysis to study the control parameters optimization and stability of the virtual synchronous inverter. Research work about virtual synchronous inverter grid-tie control have also been investigated and applied to the actual grid-tie control. However, these researches are focused on the steady-state control and parameters optimization with few considerations on the impact on the inverter when a grid fault occurs. Actually, the inrush current will endanger the stable operation of the inverter and even be strong enough to destroy the inverter.

SUMMARY OF THE PRESENT INVENTION

The invention provides a fault inrush transient current restraining type virtual synchronous inverter and thereof to solve the problem that a virtual synchronous inverter will be burned due to inrush transient current in an extreme situation of a symmetrical fault occurring on the grid side. The technical solution adopted is as follow.

A fault inrush transient current restraining type virtual synchronous inverter, comprising: an information collection module for inverter output voltages and currents, a virtual synchronous inverting control module, a fault detection and synthesize module, a hysteresis comparison control module and a post fault clearing switch back grid-tie control module; wherein the information collection module for the inverter output voltages and currents collects an output three-phase voltage signal of the inverter, an output three-phase current signal of the inverter and a PCC (point of common coupling) voltage signal (named PCC voltage signal);

the virtual synchronous inverting control module realizes virtual synchronous generator characteristics when the system operates normally;

the fault detection and synthesize module detects an output current instantaneous value of the inverter and a voltage peak value of the PCC in real time, determines whether there is a fault or whether the fault is cleared on a grid-side and performs a logic synthesis function;

the hysteresis comparison control module suppresses an inrush current while a grid side fault;

the post fault clearing switch back grid-tie control module starts a switch back control by adopting a fault clearing signal given by the fault detection and synthesize module; a hysteresis comparison control output is switched to a conventional virtual synchronous inverting control.

Furthermore, the information collection module for the inverter output voltages and currents collects voltage signals from filter capacitors C and current signals from filter inductances $L_s$ at the output side of the inverter, transmits current signals to a current signal input terminal of the virtual synchronous inverting control module, a current signal input terminal of the hysteresis comparison control module and a current signal input terminal of the fault detection and synthesize module and transmits voltage signals to a voltage signal input terminal of the fault detection and synthesize module.

Furthermore, the virtual synchronous inverting control module takes the inverter output current signal $i_s$ as one input and multiplies $i_s$ with the three-phase voltage reference value according to the power calculation formula as the other power input. An active inertia droop loop of the virtual synchronous inverting control module receives an active power input and performs an inertia calculation and a droop calculation to achieve an angular velocity of the reference wave; the angular velocity is integrated to achieve a phase angle of the reference wave; a reactive inertia drooploop of the virtual synchronous inverting control module receives a reactive power input and performs inertia calculation and droop calculation to achieve a value of a virtual excitation; the value of the virtual excitation multiply the angular velocity of the reference wave to achieve an amplitude of an output signal; finally, the amplitude multiplies a sine of the angular velocity of the reference wave as an output of the virtual synchronous inverting control module.

Furthermore, inputs of the fault detection and synthesize module are an output current signal of the inverter and a PCC voltage signal; the output current instantaneous value is compared with a pre-set over-current protection value; when the output current instantaneous value exceeds the pre-set over-current protection value, a switch signal $t_{rig}$ is outputted as an input of the fault detection and synthesize module; the PCC voltage signal is inputted into the fault detection and synthesize module, a peak of which is detected through peak detection; switch signals outputted by a fault triggering module are integrated and outputted as a switch signal; when a fault occurs, the switch signal is sending out and maintaining until the PCC voltage recovers and approaches a rated voltage; the re-switch signal is the output of the fault detection and synthesize module.

Furthermore, the hysteresis comparison control module phase locks a PCC voltage outputted by the information collection module for the inverter output voltages and currents of the inverter to achieve and output phase A to the hysteresis comparison control module, a three-phase given value of current is generated with consideration of a pre-set over-current protection value; the three-phase given value is subtracted from a current value of the information collection module for the inverter output voltages and currents before passes a hysteresis loop comparator an output of which acts as a control signal to drive an IGBT (insulated gate bipolar transistor).

Furthermore, input signals of the post fault clearing switch back grid-tie control module are PCC voltages outputted by the information collection module for the inverter output voltages and currents and output signals of the fault detection and synthesize module; wherein a triphasic voltage of the inverter is subtracted from a PCC voltage signal before being divided by a virtual resistance to achieve a virtual current as a current input of the virtual synchronous inverting control module; an output of the fault detection and synthesize module acts as a switch signal which starts a switch from a hysteresis comparison control to the virtual synchronous inverting control module.

Another technical solution of the present invention is a control method of the fault inrush transient current restraining type virtual synchronous inverter, wherein while normal operating, an output current of a virtual synchronous inverter passes through the information collection module for the inverter output voltages and currents before being sent to the fault detection and synthesize module; the output current is determined not to exceed a pre-set over-current protection value; a switch back grid-tie control module and the hysteresis comparison control module is inactive; the virtual synchronous inverting control module runs normally;

when a short-circuit fault occurs, the output current of the virtual synchronous inverter passes through the information collection module for the inverter output voltages and currents before being sent to the fault detection and synthesize module; the output current is determined to exceed a pre-set over-current protection value; the fault detection and synthesize module sends out a switch start signal to the virtual synchronous inverting control module; the virtual synchronous inverting module is switched to a switch back grid-tie control module; a drive control signal of the inverter is switched from an output of the virtual synchronous inverting control module to an output of the hysteresis comparison; after the short-circuit fault is cleared, a PCC voltage of the virtual synchronous inverter passes through the information collection module for the inverter output voltages and currents and is sent to the fault detection and synthesize module; if the peak value is detected to have recovered; the fault detection and synthesize module sends out switch back start signal to the switch back grid-tie control module; the switch back grid-tie control module is switched to the virtual synchronous inverting control module; the drive control signal of the inverter switches from the hysteresis comparison control module to the virtual synchronous inverting control module; a non-inrush switch back is realized and the whole process of restraining an inrush current is completed, The benefits of the present invention are as follow. The invention is a combination of a virtual synchronous inverting control and a hysteresis compassion control When the grid voltage drops below the value which endangers the inverter, the virtual synchronous inverter rapidly switches to the hysteresis comparison output status to rapidly restrain the inrush current. The inverter is ensured not to be removed from grid while providing voltage support to the grid, which ensures a low voltage ride through capability at a later stage while the fault period. When the fault is cleared the virtual synchronous inverter is switched back to the virtual synchronous operation mode without inrush current. The proposed invention has the advantages of the virtual synchronous inverting control function while has the capability of restraining the inrush current which will impact the inverter itself when the grid fault.

BRIEF DESCRIPTION OF THE DRAWINGS

In order to better illustrate the embodiments of the present invention or the conventional technical solution, a brief introduction of the drawings adopted by the embodiments or the conventional techniques are as below. Obviously, the drawings are just for the embodiments of the present invention. For a skilled technician in the field, other drawings are able to be brought up based on the drawings of the present invention without innovative efforts.

DETAILED DESCRIPTION OF THE PREFERRED EMBODIMENT

Referring to FIG. 1 to FIG. 6 of the drawings, the technical solution of a preferred embodiment of the present invention is illustrated, wherein the embodiment described is just a one of the embodiment of the present invention not all. A skilled technician is able to bring up other embodiments without innovative efforts based on the embodiment of the present invention. All the embodiments are within the protection range of the present invention.

A fault inrush transient current restraining type virtual synchronous inverter, comprising: an information collection module for inverter output voltages and currents, a virtual synchronous inverting control module, a fault detection and synthesize module, a hysteresis comparison control loop module and a post fault clearing switch back grid-tie control module; wherein the information collection module for the inverter output voltages and currents collects an output voltage signal of the inverter, an output current signal of the inverter and a PCC (point of common coupling) voltage signal;

the virtual synchronous inverting control module realizes virtual synchronous generator characteristics while the system operates normally;

the fault detection and synthesize module detects an output current instantaneous value and a voltage peak value of the inverter in real time, determines whether there is a fault and whether the fault is cleared on the grid-side and performs a logic synthesis function;

the hysteresis comparison control module suppresses an inrush current while a grid side fault;

the post fault clearing switch back grid-tie control module starts a switch back control by adopting a fault clearing signal given by the fault detection and synthesize module; a hysteresis comparison control output is switched to a conventional virtual synchronous inverting control.

While normal operating, an output current of a virtual synchronous inverter passes through the information collection module for the inverter output voltages and currents before being sent to the fault detection and synthesize module; the output current is determined not to exceed a pre-set over-current protection value; a switch back grid-tie control module and the hysteresis comparison control module is inactive; the virtual synchronous inverting control module runs normally;

when a short-circuit fault occurs; the information collection module for the inverter output voltages and currents detects the output current of the virtual synchronous inverter and then the output current of the virtual synchronous inverter flows to the fault detection and synthesize module; the output current is determined to exceed a pre-set over-current protection value; the fault detection and synthesize module sends out a switch start signal to the virtual synchronous inverting control module; the virtual synchronous inverting module is switched to a switch back grid-tie control module; a drive control signal of the inverter is switched from an output of the virtual synchronous inverting control module to an output of the hysteresis comparison; after the short-circuit fault is cleared, a PCC voltage of the virtual synchronous inverter passes the information collection module for the inverter output voltages and currents and is sent to the fault detection and synthesize module; if the peak value is detected to have recovered; the fault detection and synthesize module sends out switch back start signal to the switch back grid-tie control module; the switch back grid-tie control module is switched to the virtual synchronous inverting control module; the drive control signal of the inverter switches from the hysteresis comparison control module to the virtual synchronous inverting control module; a non-inrush switch back is realized and the whole process of restraining an inrush current is completed.

Furthermore, the information collection module for the inverter output voltages and currents comprises Hall 1, Hall 2, a signal conditioning module 1, a signal conditioning module 2, a fault triggering module, AD1, AD2, AD3, wherein the information collection module for the inverter output voltages and currents collects voltage signals from a filter capacitor C and current signals from a filter inductance $L_s$ at an output side of the inverter, transmits voltage signals and current signals to input terminals (as a and b terminals shown in FIG. 1) of the virtual synchronous inverting control module and input terminals (as a and b terminals shown in the FIG. 1) of the fault detection and synthesize module by a wire transmission but not limited to a wire transmission.

Figure 1:
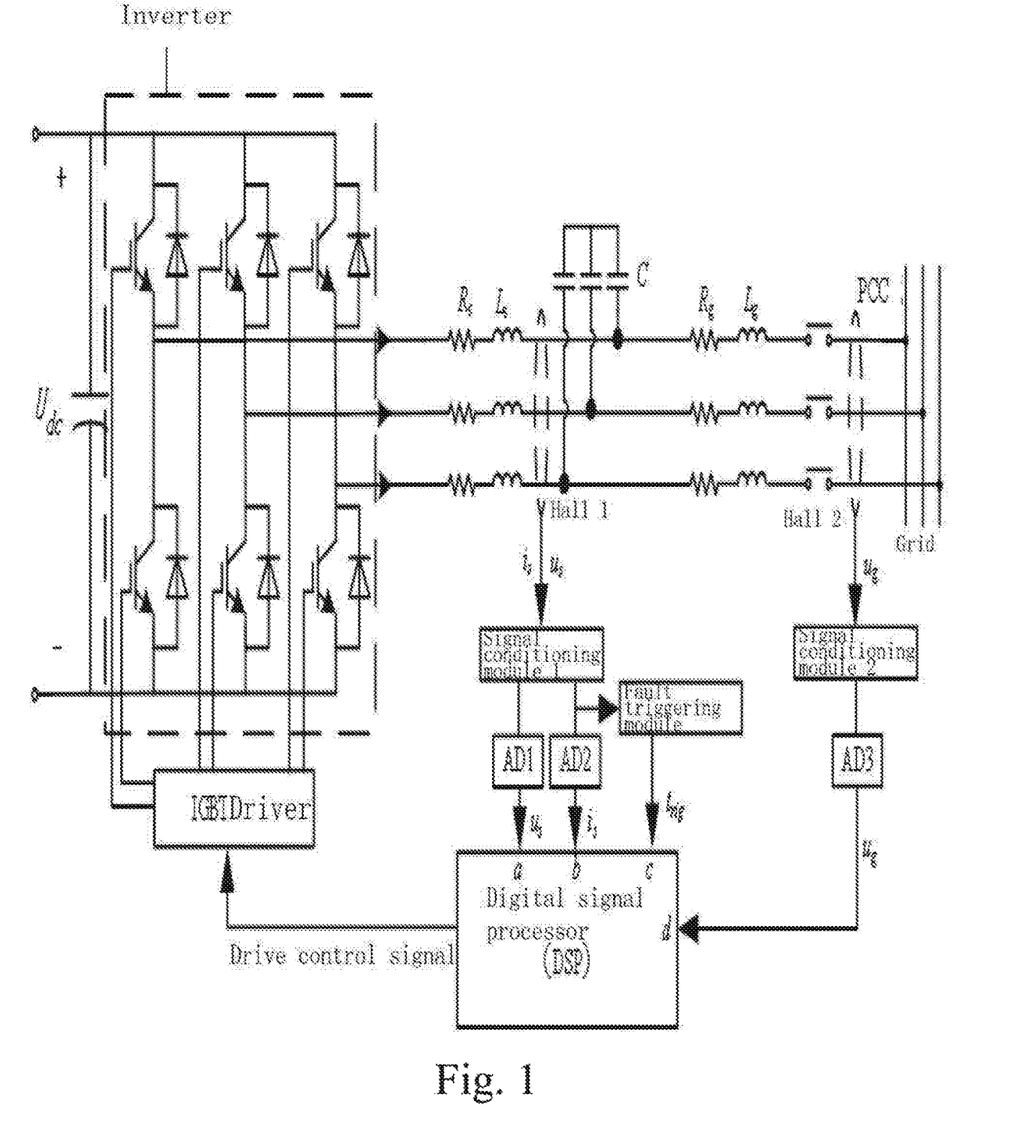
FIG. 1 is an example of application of a fault inrush transient current restraining type virtual synchronous inverter of an embodiment of the present invention on a direct current power source inverting grid-tie.
Figure 2:
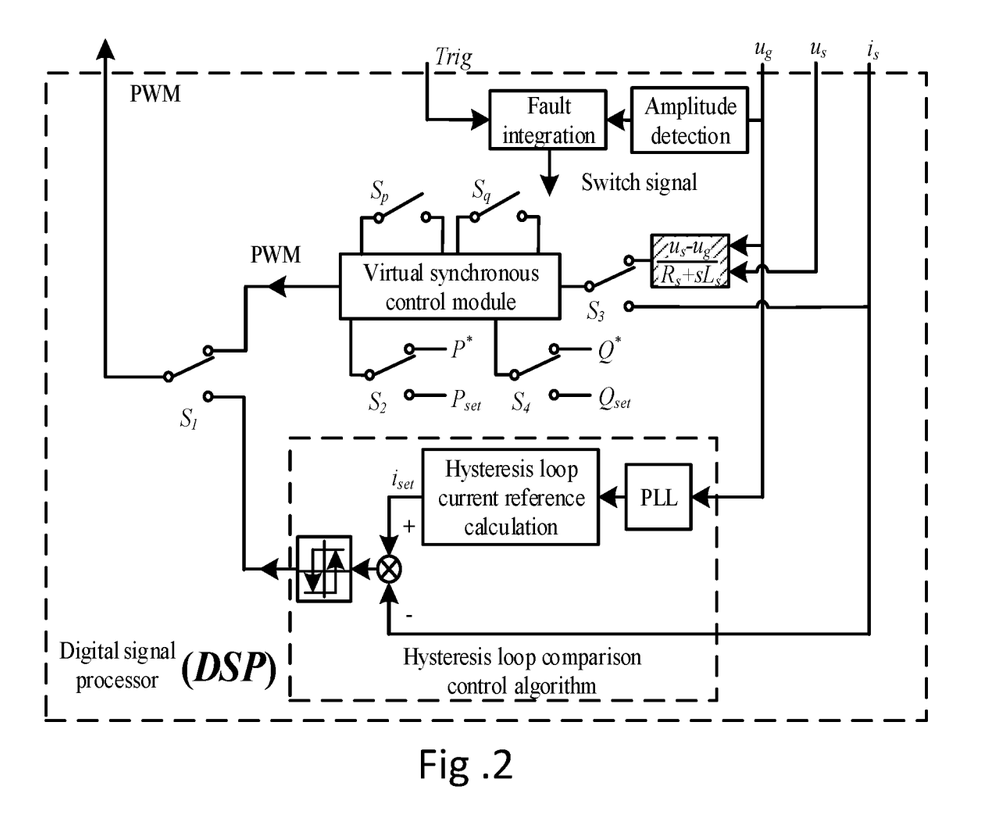
FIG. 2 is internal logic drawing of the virtual synchronous inverter provided by the embodiment of the present invention.
Figure 4:
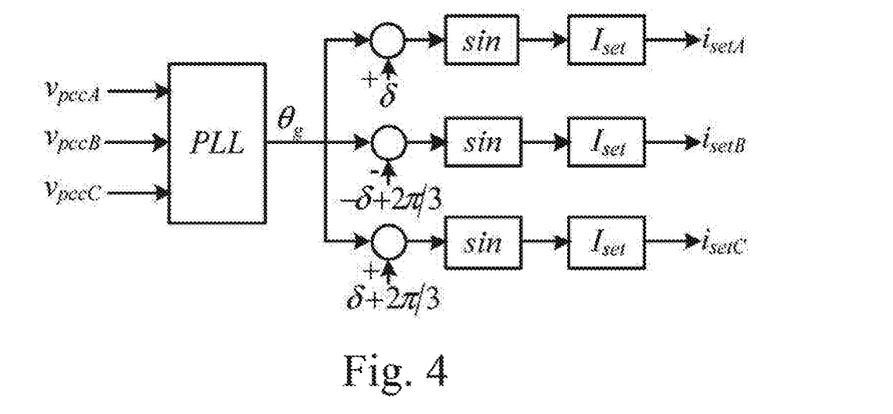
FIG. 4 is a hysteresis loop current reference diagram of the virtual synchronous inverter provided by the embodiment of the present invention.

Furthermore, the virtual synchronous inverting control module (as shown in FIG. 2, virtual synchronous control module and $S_1$, $S_2$, $S_3$, $S_4$, $S_p$, $S_q$) is connected in a way which $S_1$, $S_2$, $S_4$ are connected to position 1; $S_3$ is connected to position 2; $S_p$ and $S_q$ are closed; wherein takes the outputted current signal $i_s$ of the inverter as an input; multiplies $i_s$ by the reference value of the three-phase voltage at that time according to the power calculation formula as the power input of the virtual synchronous inverting control module; an active inertia droop loop of the virtual synchronous inverting control module receives an active power input and performs an inertia calculation and a droop calculation to achieve an angular velocity of a reference wave; the angular velocity is integrated to achieve a phase angle of the reference wave; a reactive inertia droop loop of the virtual synchronous inverting control module receives a reactive power input and performs inertia calculation and droop calculation to achieve a value of a virtual excitation; the value of the virtual excitation multiply the angular velocity of the reference wave to achieve an amplitude of an output signal; finally, the amplitude multiplies a sine of the angular velocity of the reference wave as an output of the virtual synchronous inverting control module;

furthermore, the fault detection and synthesize module comprises a fault triggering module in FIG. 1 and a fault synthesize module on an up right corner in FIG. 2, wherein an input of the fault detection and synthesize module is an output current signal of the inverter and a grid-tie (PPC) voltage signal; the output current instantaneous value is compared with a pre-set over-current protection value; when the output current instantaneous value exceeds the pre-set over-current protection value, a switch signal $t_{rig}$ is outputted as an input of the fault detection and synthesize module (as shown in FIG. 2, fault synthesize module); the grid-tie (PPC) voltage signal is inputted into the fault detection and synthesize module, a peak of which is detected through peak detection; switch signals outputted by a fault triggering module are synthesize and outputted as a switch signal; when a fault occurs, the switch signal is sending out and maintaining until the PCC voltage recovers and approaches the rated voltage; the switch signal recovers, which is an output of the fault detection and synthesize module;

furthermore, the hysteresis comparison control module (as shown in FIG. 2) is connected in a way which a grid-tie (PCC) voltage of the information collection module for the inverter output voltages and currents of the inverter is phase locked to achieve and output phase A to the hysteresis comparison control module, a three-phase given value of current (as shown in FIG. 4) is generated with consideration of a pre-set over-current protection value; the three-phase given value is subtracted from a current value of the information collection module for the inverter output voltages and currents before passes a hysteresis comparator an output of which acts as a control signal to drive an IGBT (insulated gate bipolar transistor, as shown in the dotted blocks of FIG. 1);

furthermore, the switch back grid-tie control module (as shown in the FIG. 2, the slashed block, the virtual synchronous control module and $S_1$, $S_2$, $S_3$, $S_4$, $S_p$, $S_q$) is connected in a way ($S_1$, $S_2$, $S_4$ are connected to position 2; $S_3$ is connected to position 1; $S_p$ and $S_q$ are closed) which the input signals of the post fault clearing switch back grid-tie control module are grid-tie (PCC) voltages of the information collection module for the inverter output voltages and currents and outputs of the fault detection and synthesize module; wherein a triphasic potential of the inverter is subtracted from a PCC voltage signal before being divided by a virtual resistance to achieve a virtual current as a current input of the virtual synchronous inverting control module; an output of the fault detection and synthesize module acts as a switch signal which starts a switch from a hysteresis comparison control to the virtual synchronous inverting control module;

Furthermore, the basic theory of the virtual synchronous control module is to add a virtual inertia to the active loop and the reactive loop respectively based on the droop characteristics of the active power and reactive power; to droop the output voltage frequency and amplitude by adjusting the active and reactive droop control coefficient; wherein the droop value of the voltage frequency and amplitude caused by droop control are as follow:

$$\omega = \frac{1}{1+\tau_f s}[\omega^* - n_p(P-P^*)] \quad (1)$$

$$E = \frac{1}{1+\tau_v s}[E^* - n_q(Q-Q^*)] \quad (2)$$

Wherein, $\omega$ denotes a reference voltage frequency; $n_p$ denotes an active droop coefficient; $\omega^*$ denotes a given angular frequency; P denotes an electromagnetic power outputted by the inverter; P* denotes a given electromagnetic power outputted by the inverter; $\tau_f$ denotes an inertia parameter of the simulated synchronous generator rotor inertia.

S denotes complex variable, which transform the time-domain signal to the complex frequency domain signal and is also called complex frequency.

E denotes the reference voltage amplitude, $n_q$ denotes the reactive droop coefficient; E* denotes a given voltage amplitude; Q denotes the reactive power outputted by the inverter; Q* denotes a given reactive power outputted by the inverter; $\tau_v$—denotes an inertia coefficient of the reactive inertia of the simulated synchronous generator.

When a fault occurs in the grid, the reference voltage frequency $\omega$ of the virtual synchronous inverter changes slowly due to the effect of the inertia loop, which leads to a strong active impact or even oscillation on the grid side and the inverter. The inertia loop enables the virtual synchronous inverter to possess the inertia characteristics similar as the synchronous generator. When the fault occurs in the grid, the reference voltage amplitude E of the virtual synchronous inverter changes slowly, which leads to a strong reactive impact or even oscillation on the grid side and the inverter.

In order to solve the problem, the present invention adopts a mode switch method from an angle of control, which restrains the impact when the grid side fault occurs. In order to speed up the restraining of the inrush current, the present invention adopts a method of detecting a current instantaneous value outputted by the inverter to switch to restraining. After the fault is cleared, the switch signal is generated for switching back to the virtual synchronous control by detecting whether the grid-tie (PCC) voltage is recovered. The hysteresis comparison is a transient current tracking and modulating method. The fundamental theory is detecting the current instantaneous value outputted by the inverter; wherein the current instantaneous value subtracts a sine reference wave; when the difference exceeds $H_w/2$, a lower arm tube is conducting and the output current is reduced; when the difference is less than $-H_w/2$, an upper arm tube is conducting and the output current is increased. $H_w$ denotes the loop width of the hysteresis loop control.

Furthermore, the inrush current restraining type virtual synchronous inverting control method is explained as below. In order to prevent the virtual synchronous inverter from being damaged during the grid side fault and to maintain the grid with power, switching the control to hysteresis comparison mode and infusing the grid with the active power and reactive power of appropriate proportion according to international standard starting the post fault clearing switch back process by detecting and determining whether the grid-tie (PCC) voltage is recovered; switching the control back to virtual synchronous control without impact after a while to eliminate the grid impact on the inverter and simultaneously, the inertia characteristics of the virtual synchronous generator is guaranteed; multiplying the detected three-phase output current instantaneous value with the inverter potential to achieve an output active power P and reactive power Q which subtract the given active power P* and the given reactive power Q* respectively; multiplying P–P* and Q–Q* with the active droop coefficient $n_p$ and the reactive droop coefficient $n_q$ respectively to achieve $n_p$(P–P*) and $n_q$(Q–Q*) which are subtracted by $\omega^*$ and E* respectively; The active inertia loop and the reactive inertia loop separately integrate the results obtained from the previous subtractions, then the angular velocity $\omega$ and the voltage amplitude E can be achieved; wherein the angular velocity $\omega$ is integrated to achieve a phase A of the reference wave; according to the amplitude and the phase angle of the phase A to calculate a reference sine wave of the phase A which is rotated counterclockwise and clockwise for 120 degrees to achieve phase B and phase C reference wave; comparing the phase B and phase C reference wave with a sawtooth wave signal sent by a sawtooth wave generator inside the PWM (pulse width modulation) controller to achieve the control signals of all the IGBT (insulated gate bipolar transistor) inside the inverter to control the switch on and off of all the IGBT inside the inverter; once the fault detection module detects a fault on the grid side by detecting the transient output of the inverter, the system is switched to the hysteresis comparison control mode; wherein phase A of the PCC is detected by PLL (phase-locked loops) and a power factor angle δ is calculated according to the international standard of infusion proportion of the active power and reactive power; δ adds the phase A of PCC to achieve phase A of the hysteresis loop reference wave; the current amplitude of the hysteresis loop reference wave is set according to the given value of the system; the hysteresis loop reference wave is determined by the amplitude and phase; the reference wave is compared with the current instantaneous value outputted by the inverter; the switch on and off of the IGBT is controlled by the drive pulses generated by the hysteresis compassion; meanwhile, the output current of the inverter is converted to dq variables; the inverter potential is also converted to dq variables; the potential amplitude multiplies $i_d$ to achieve a given active power of the virtual synchronous inverter at the time; the potential amplitude multiplies $i_q$ to achieve a given reactive power; a virtual resistance which equals the resistance connected to the grid-tie (PCC) is introduced to connect the virtual synchronous inverting control algorithm and the PCC at the time; the current flows through the virtual resistance equals the hysteresis loop output current which is the foundation for non-inrush current switch back; the PCC voltage amplitude is detected and the voltage is determined to be recovered; the virtual current and the hysteresis loop output current is totally identical after a while; the switch back process is started and the switch from hysteresis loop current-limiting to the virtual synchronous inverting control is completed.

FIG. 1 is an example of application of an inrush transient current restraining type virtual synchronous inverter on a direct current power source inverting grid-tie. The embodiment mainly comprises a DC power source $U_{dc}$, a three-phase PWM inverter (as shown in FIG. 1, the dotted block), a PWM driver (as shown in FIG. 1, the IGBT driver on the left bottom corner), a circuit equivalent resistance ($R_g$, $L_g$) alternative grid, a inverter output LC filter ($L_s$ and C), a controller (as shown in FIG. 1, digital signal processor DSP). The direct current power source $U_{dc}$ provides power to the inverter and maintains a stable DC (direct current) bus voltage; the collected voltage signal, current signal, and PCC voltage signal of the outputted by the inverter are the input signal of the virtual synchronous control loop, fault detection and synthesize module and the switch back grid-tie control module respectively. The invert side resistances are $R_s$ and $L_s$; the grid side connecting circuit resistances are $R_g$ and $L_g$. the voltage signal $u_s$ and current signal $i_s$ at the output terminals of the inverter, the grid-tie (PCC) voltage signal $u_g$ are collected and transmitted to the inrush current restraining type virtual synchronous inverter as the actual voltage and current input.

The direct current power source $U_{dc}$ includes but not limited to battery, photovoltaic panel and etc. The direct current input is converted to the alternative current the frequency of which is around 50 Hz by the PWM inverter.

The output terminals of the three-phase PWM inverter is connected to a LC filter for filter high-frequency harmonic and improving the waveform quality.

FIG. 2 is internal logic drawing of the digital signal processor. The inputs of the digital signal processor comprise the fault triggering signal $t_{rig}$, the voltage signal $u_s$ outputted by the inverter, the current signal $i_s$ outputted by the inverter and the grid-tie (PCC) voltage signal $u_g$; the output of the digital signal processor drives the IGBT. The algorithm is shown in FIG. 3.

Figure 3:
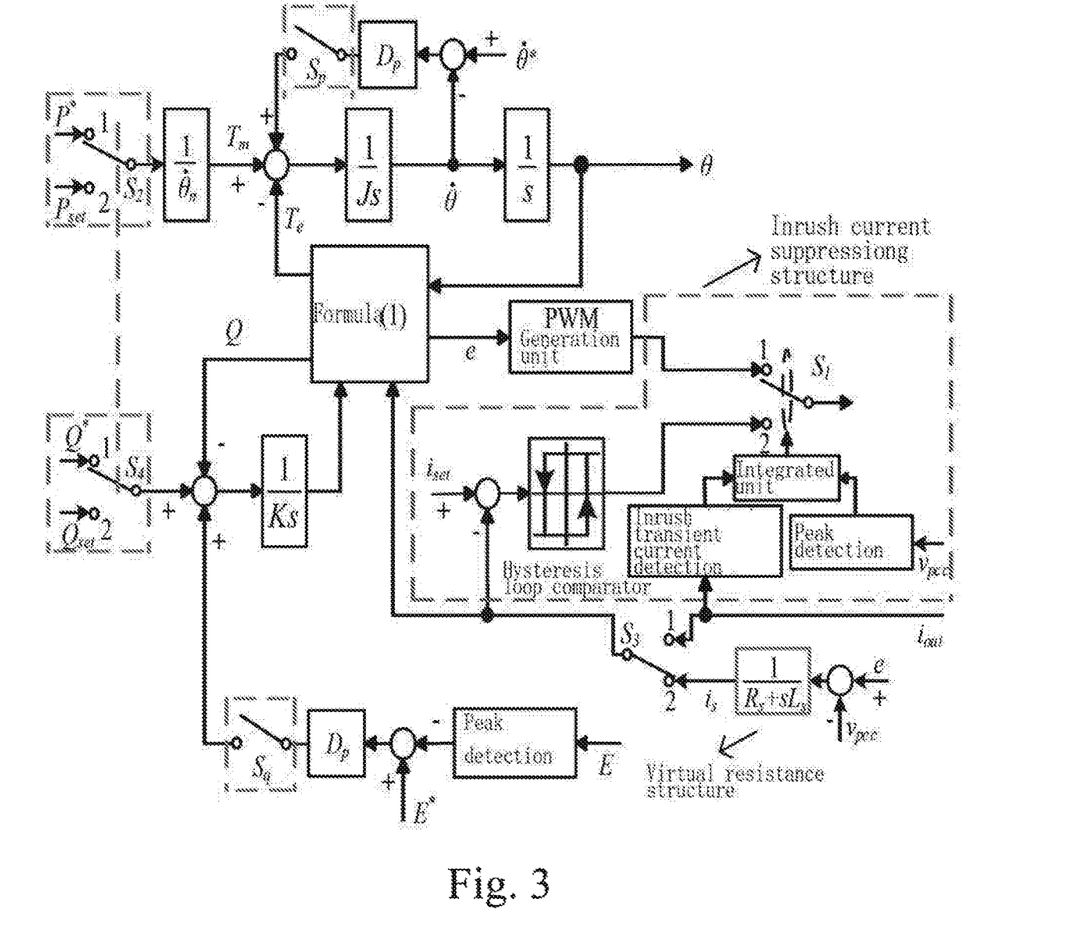
FIG. 3 is a virtual synchronous inverter control block diagram provided by the embodiment of the present invention.

The dotted blocks $S_1$, $S_2$, $S_3$, $S_4$, $S_p$, $S_q$ in FIG. 3 are auxiliary switches for control mode switch, the inrush current restraining structure and the virtual resistance structure, which is the core control algorithm of the FIG. 1. The FIG. 3 illustrated the mathematics mechanism of the inrush current restraining type virtual synchronous inverting control in detail. The mathematics mechanism of the inrush current restraining type virtual synchronous inverting control shown in the FIG. 3 is analyzed in the embodiment.

The inrush current restraining type virtual synchronous inverting control mathematics block shown in FIG. 3 contains three sets of input signals shown in the FIG. 1 which are the voltage signal $u_s$ outputted by the inverter, the current signal $i_s$ outputted by the inverter and the grid-tie (PCC) voltage signal $u_g$ besides the control target reference voltage e.

Figure 5:
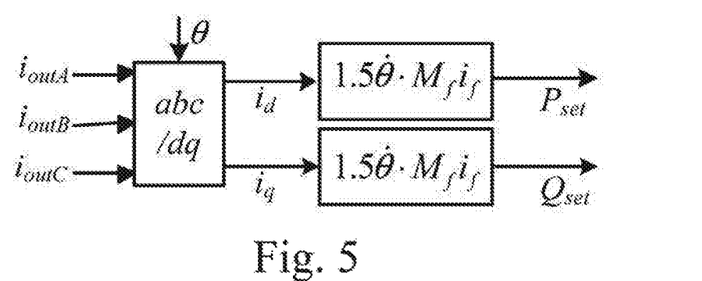
FIG. 5 is a switch back power reference tensorflow of the virtual synchronous inverter provided by the embodiment of the present invention.
Figure 6:
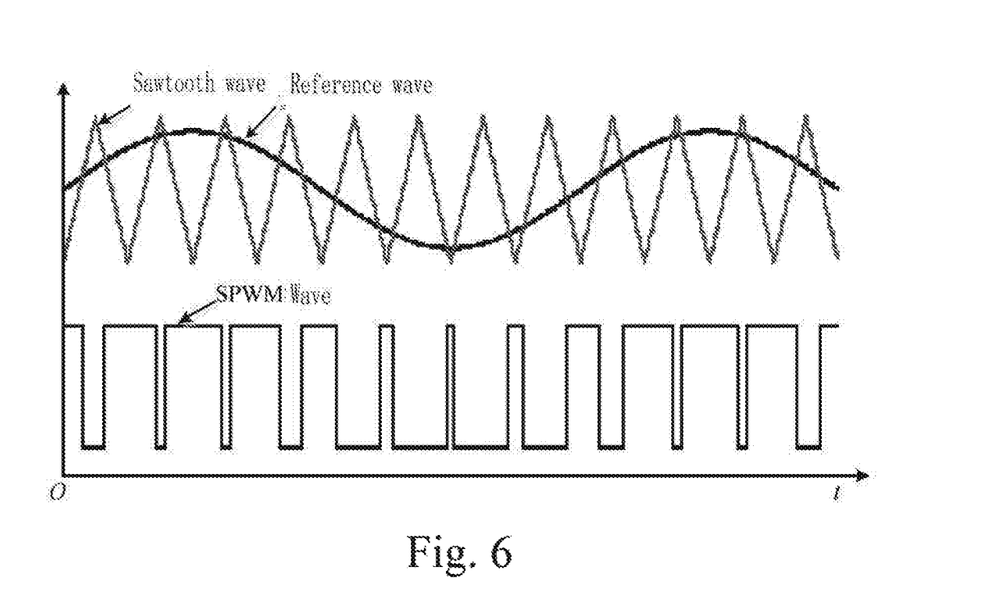
FIG. 6 is a schematic diagram to illustrate a generation of a PWM drive module control signal.

The mathematics mechanism shown in the FIG. 3 is as follow: multiplying the detected three-phase output current instantaneous value $i_s$ with the inverter potential to achieve the output active power P and reactive power Q; subtracting the given active the given active power P* and the given reactive power Q* from the output active power P and reactive power Q respectively; multiplying P−P* and Q−Q* with the active droop coefficient $n_p$ and the reactive droop coefficient $n_q$ respectively to achieve $n_p$(P−P*) and $n_q$(Q−Q*) which are subtracted by ω* and E* respectively; The active inertia loop and the reactive inertia loop separately integrate the results obtained from the previous subtractions, then the angular velocity ω and the voltage amplitude E can be achieved; wherein the angular velocity ω is integrated to achieve a phase A of the reference wave; calculating a reference sine wave of the phase A according to the amplitude and an angle of the phase A; rotating the reference sine wave of the phase counterclockwise and clockwise for 120 degrees to achieve phase B and phase C reference wave; comparing the phase B and phase C reference wave compares with a sawtooth wave signal sent by a sawtooth wave generator inside the DSP (digital signal processing) to achieve the control signals of all the IGBT inside the inverter to control the switch on and off of all the IGBT inside the inverter; once the fault detection module detects a fault on the grid side by detecting the transient output of the inverter, switching the system to the hysteresis loop comparison control mode; wherein the given reference wave is shown in FIG. 5; phase A of the PCC is detected by phase-locked loops and a power factor angle δ is calculated according to the international standard of infusion proportion of the active power and reactive power; δ adds the phase A of PCC to achieve phase A of the hysteresis loop reference wave; the current amplitude of the hysteresis loop reference wave is set according to the given value of the system; the hysteresis loop reference wave is determined by the amplitude and phase; the reference wave is compared with the current instantaneous value outputted by the inverter; the switch on and off of the IGBT is controlled by the drive pulses generated by the hysteresis compassion; meanwhile, the output current of the inverter is converted to dq variables; the inverter potential is also converted to dq variables; the potential amplitude multiplies $i_d$ (the direct axis current component of the output current $i_s$ of the inverter under a synchronous rotating coordinates) to achieve a given active power of the virtual synchronous inverter at the time; the potential amplitude multiplies $i_q$ (the direct axis current component of the output current $i_s$ of the inverter under a synchronous rotating coordinates) to achieve a given reactive power; a virtual resistance which equals the resistance connected to the grid-tie (PCC) is introduced to connect the virtual synchronous inverting control algorithm and the grid tie (PCC) at the time; the current flows through the virtual resistance equals the hysteresis loop output current which is the foundation for non-inrush current switch back; detecting the PCC voltage amplitude and determining the voltage to be recovered; wherein when the virtual current and the hysteresis loop output current is totally identical after a while, the switch back process is started and the switch from hysteresis loop current-limiting to the virtual synchronous inverting control is completed.

The working method of the fault detection and synthesize module is as follow. The inputs of the fault detection and synthesize module are the three-phase output current instantaneous value $i_s$ and the three-phase voltage on the PCC. Every time when the sampling module (as shown in the middle part of the FIG. 1, include Hall 1, Hall 2, signal conditioning module 1, signal conditioning module 2, AD1, AD2 and AD3) sends data to the fault triggering module, the fault triggering module first check whether $i_s$ reaches or is over the set protection value. Once the $i_s$ reaches or is over the protection value, a switch signal is sent to the main control part immediately to switch the control from the virtual synchronous inverting control to the hysteresis comparison control rapidly. At the mean time, the amplitude of the $u_g$ is detected. Once the amplitude of the $u_g$ is recovered, the system is maintained for 0.3 s before a switch back signal is sent out to switch the control from the hysteresis loop control to the virtual synchronous control. The 0.3 s delay is to give the controller enough time to wait until the virtual current passing through the virtual resistance is identical with hysteresis loop output current. The switch process or the inrush current is thus weakened. The time delay is estimated to be 0.3 s according to the present model as an example and the actual time delay is not limited to 0.3 s.

The control method of the PWM driver is as follow. When the PWM driver receives the three-phase reference wave signal e outputted by the inrush current restraining type virtual synchronous inverting control, in normal condition $-1<e<1$, the three-phase reference wave signal e is compared to the sawtooth wave of 6.4 kHz in the PWM driver as shown in the FIG. 6. When the value of three-phase reference wave signal e is bigger or equal to the value of the sawtooth wave signal, the PWM driver transmits high level switch on drive signal to the IGBT control terminals of the direct-current converter until the value of the three-phase reference wave signal e is bigger than the value of the sawtooth wave signal. Meanwhile, the PWM driver transmits low level switch off signal to the IGBT control terminals. The frequency of the sawtooth wave signal is 6.4 kHz which is based on the present model and is just an example. The actual frequency is not limited to 6.4 kHz.

The relation terminologies such as first and second are just for discriminating one body or operation with another body or operation and not necessarily require or hint an actual relation or order to exist among the body or the operation. The terminology include, contain or other variation of include or contain covers non-exclusive inclusion, which not only include a series of listed elements, methods, objects or equipment but also include other element not listed or the inherent elements of the processes methods, objects or equipments. Without extra limitations, the sentence starting with "include" does not exclude other similar elements exist in the processes, methods, objects listed.

The similar parts of the embodiments of the present invention are able to be borrowed among the embodiments. The differences among the embodiments are described with emphasis.

One skilled in the art will understand that the embodiment of the present invention as shown in the drawings and described above is exemplary only and not intended to be limiting.

The embodiments have been shown and described for the purposes of illustrating the present invention and is not a limitation of the present invention. Any modifications, alterations and improvements without departure from the principles and spirit of the present invention are within the protection scope of the present invention

What is claimed is:

1. A fault inrush transient current restraining type virtual synchronous inverter, comprising:
    an information collection module for inverter output voltages and currents,
    a virtual synchronous inverting control module,
    a fault detection and synthesize module,
    a hysteresis comparison control loop module and
    a post fault clearing switch back grid-tie control module;
    wherein the fault inrush transient current restraining type virtual synchronous inverter further comprises a direct current power source and a digital signal processor,
    wherein the information collection module for the inverter output voltages and currents collects an output voltage signal of the inverter, an output current signal of the inverter and a PCC voltage signal; the information collection module for the inverter output voltages and currents comprises a signal conditioning module 1, a signal conditioning module 2, an analog-to-digital converter 1 (AD1), an analog-to-digital converter 2 (AD2), and an analog-to-digital converter 3 (AD3), which is arranged outside the digital signal processor;
    the virtual synchronous inverting control module realizes virtual synchronous generator characteristics while a system operates normally, which is arranged inside the digital signal processor;
    the fault detection and synthesize module detects an output current instantaneous value and a voltage peak value of the inverter in real time, determines whether there is a fault and whether the fault is cleared on a grid-side and performs a logic synthesis function; the fault detection and synthesize module comprises a fault triggering module and a fault synthesize module;
    the hysteresis comparison control loop module suppresses an inrush current during a grid side fault; the hysteresis comparison control module comprises a phase-locked loop module, hysteresis loop current reference calculation module and a comparing module, which is arranged inside the digital signal processor; and
    the post fault clearing switch back grid-tie control module starts a switch back control by adopting a fault clearing signal given by the fault detection and synthesize module; then a hysteresis comparison control output is switched to a virtual synchronous inverting control module; the post fault clearing switch back grid-tie control module comprises a virtual resistance module and switches ($S_1$, $S_2$, $S_3$, $S_4$, $S_p$, $S_q$), which is arranged inside the digital signal processor, and
    wherein the signal conditioning module 1 and the signal conditioning module 2 are arranged parallelly for each other and do not directly connect to each other, and
    the signal conditioning module 1 connects to the fault triggering module.

2. The fault inrush transient current restraining type virtual synchronous inverter, as recited in claim 1, wherein the information collection module for the inverter output voltages and currents collects voltage signals from a filter capacitor C and current signals from a filter inductance $L_s$ at an output side of the inverter, transmits the current signals to a current signal input terminal of the virtual synchronous inverting control module, a current signal input of the hysteresis comparison control module and a current signal input terminal of the fault detection and synthesize module, and transmits the voltage signals to a voltage signal input terminal of the fault detection and synthesize module.

3. The fault inrush transient current restraining type virtual synchronous inverter, as recited in claim 1, wherein the virtual synchronous inverting control module multiplies a current signal $i_s$ outputted by the inverter and a three-phase voltage reference value at that time according to a power calculation formula as a power input of the virtual synchronous inverting control module; an active inertia droop loop of the virtual synchronous inverting control module receives an active power input and performs an inertia calculation and a droop calculation to achieve an angular velocity of a reference wave; the angular velocity is integrated to achieve a phase angle of the reference wave; a reactive inertia droop loop of the virtual synchronous inverting control module receives a reactive power input and performs the inertia calculation and the droop calculation to achieve a value of a virtual excitation; the value of the virtual excitation multiplies the angular velocity of the reference wave to achieve an amplitude of an output signal; finally, the amplitude multiplies a sine of the angular velocity of the reference wave as an output of the virtual synchronous inverting control module.

4. The fault inrush transient current restraining type virtual synchronous inverter, as recited in claim 1, wherein an input of the fault detection and synthesize module is an output current signal of the inverter and the PCC voltage signal; the output current instantaneous value is compared with a pre-set over-current protection value; when the output current instantaneous value exceeds the pre-set over-current protection value, a switch signal $t_{rig}$ is outputted as an input of the fault detection and synthesize module; the PCC voltage signal is inputted into the fault detection and synthesize module, a peak of which is detected through peak detection; switch signals outputted by the fault triggering module are integrated and outputted as a switch signal; when a fault occurs, the switch signal is sent out and maintained until the PCC voltage recovers and approaches a rated voltage; the switch signal recovers which is an output of the fault detection and synthesize module.

5. The fault inrush transient current restraining type virtual synchronous inverter, as recited in claim 1, wherein the hysteresis comparison control module phase locks a PCC voltage of the information collection module for the inverter output voltages and currents of the inverter to achieve and output phase A to the hysteresis comparison control module, a three-phase given value of current is generated with consideration of a pre-set over-current protection value; the three-phase given value is subtracted from a current value of the information collection module for the inverter output voltages and currents before passes a hysteresis comparator an output of which acts as a control signal to drive an IGBT (insulated gate bipolar transistor).

6. The fault inrush transient current restraining type virtual synchronous inverter, as recited in claim 1, wherein input signals of the post fault clearing switch back grid-tie control module are PCC voltages of the information collection module for the inverter output voltages and currents and outputs of the fault detection and synthesize module; wherein a triphasic potential of the inverter is subtracted from the PCC voltage signal before being divided by a virtual resistance to achieve a virtual current as a current input of the virtual synchronous inverting control module; an output of the fault detection and synthesize module acts as a switch signal which starts a switch from a hysteresis comparison control to the virtual synchronous inverting control module.

\* \* \* \* \*